United States Patent
Rossi et al.

(10) Patent No.: US 9,621,037 B2
(45) Date of Patent: Apr. 11, 2017

(54) VOLTAGE REGULATOR WITH CHARGE PUMP FOR GENERATING SECOND VOLTAGE SOURCE

(71) Applicant: Microsemi Semiconductor (U.S.) Inc., Austin, TX (US)

(72) Inventors: Walter Rossi, Pozzo d'Adda (IT); Jason Larry Rabb, Austin, TX (US); David Nigel Wakely, Austin, TX (US)

(73) Assignee: Microsemi Semiconductor (U.S.) Inc., Austin, TX (US)

( * ) Notice: Subject to any disclaimer, the term of this patent is extended or adjusted under 35 U.S.C. 154(b) by 343 days.

(21) Appl. No.: 14/505,688

(22) Filed: Oct. 3, 2014

(65) Prior Publication Data
US 2015/0098562 A1 Apr. 9, 2015

Related U.S. Application Data

(60) Provisional application No. 61/887,637, filed on Oct. 7, 2013.

(51) Int. Cl.
| | |
|---|---|
| *H02M 3/156* | (2006.01) |
| *H02M 3/07* | (2006.01) |
| *H02M 1/00* | (2006.01) |
| *G05F 1/577* | (2006.01) |

(52) U.S. Cl.
CPC ............ *H02M 3/156* (2013.01); *H02M 3/07* (2013.01); *G05F 1/577* (2013.01); *H02M 2001/009* (2013.01)

(58) Field of Classification Search
None
See application file for complete search history.

(56) References Cited

U.S. PATENT DOCUMENTS

| | | | |
|---|---|---|---|
| 2003/0048002 A1* | 3/2003 | McGinn | H04M 19/005 307/11 |
| 2006/0171527 A1* | 8/2006 | Mills | H04M 3/005 379/395.01 |

(Continued)

FOREIGN PATENT DOCUMENTS

| | | |
|---|---|---|
| EP | 1199788 | 4/2002 |
| WO | 2005039033 | 4/2005 |

OTHER PUBLICATIONS

NPL International Search Report and Written Opinion correlating to PCT/CA2014/059331 dated May 6, 2015, 17 pages.

(Continued)

*Primary Examiner* — Simon Sing
*Assistant Examiner* — Jeffrey Lytle
(74) *Attorney, Agent, or Firm* — Amerson Law Firm, PLLC

(57) ABSTRACT

A voltage regulator includes a switch coupled between an input voltage terminal and an energy storage element, a first output capacitor coupled to a first node defined between the switch and the energy storage element, the first capacitor being coupled to a first output voltage terminal, a charge pump circuit coupled to the first node and comprising a second output capacitor coupled between a second output voltage terminal and the first output voltage terminal, and a controller operable to selectively enable the switch to control voltages generated at the first and second output terminals.

12 Claims, 3 Drawing Sheets

(56) References Cited

U.S. PATENT DOCUMENTS

| | | | | |
|---|---|---|---|---|
| 2008/0150621 | A1* | 6/2008 | Lesso | H02M 3/07 327/536 |
| 2008/0273007 | A1* | 11/2008 | Ng | G02F 1/167 345/107 |
| 2011/0068757 | A1* | 3/2011 | Xu | H02M 3/158 323/271 |
| 2013/0234513 | A1 | 9/2013 | Bayer | |
| 2014/0368035 | A1* | 12/2014 | Lofthouse | H02M 3/155 307/31 |

OTHER PUBLICATIONS

Lisa Dinwoodie, "Dual Output Boost Converter", Texas Instruments, Application Report SLUA288, Apr. 1, 2003, 9 pages.

Bruce D. Moore, "Reglerstrukturen Fur Batterie-Betriebene Systeme", Elektronik, W E K A Fachzeitschriften-Verlag GMBH, Jan. 25, 1994, 7 pages.

Partial International Search Report correlating to PCT/US2014/059331 dated Mar. 3, 2015, 6 pages.

* cited by examiner

VOLTAGE REGULATOR WITH CHARGE PUMP FOR GENERATING SECOND VOLTAGE SOURCE

CROSS-REFERENCE TO RELATED APPLICATION(S)

This application claims benefit of U.S. Provisional Application No. 61/887,637, filed 7 Oct. 2013 and entitled "VOLTAGE REGULATOR WITH CHARGE PUMP FOR GENERATING SECOND VOLTAGE SOURCE," which is incorporated herein by reference in its entirety.

BACKGROUND

Field of the Disclosure

The present disclosure generally relates to telecommunications, and more particularly, to a voltage regulator for generating supply voltages to support a subscriber line.

Description of the Related Art

In communications systems, particularly telephony, it is common practice to transmit signals between a subscriber station and a central switching office via a two-wire bi-directional communication channel. A line card generally connects the subscriber station to the central switching office. A line card typically includes at least one subscriber line interface circuit (SLIC) as well as a subscriber line audio-processing circuit (SLAC). The functions of the line card range from supplying talk battery to performing wake-up sequences of circuits to allow communications to take place.

Subscriber line interface circuits (SLICs) have been developed to provide an interface between a low voltage signal path in a telephone central office and a high-voltage telephone subscriber line. The SLIC provides functions such as off hook detection, ringing signal generation, and battery feed to the subscriber line. The subscriber line consists of a telephone transmission line, including two conductors referred to as A and B or tip and ring, and the subscriber telephone equipment coupled across the tip and ring conductors (i.e., the load). A SLIC provides power from the telephone central office to the subscriber line in response to a received battery voltage. DC battery voltages are provided to the SLIC to power the SLIC and the subscriber line. For example, a low negative voltage source, VBL, and a high negative voltage source, VBH, are typically provided to the SLIC. The VBL source is generally used during off-hook operation to support a call. The VBH source is generally used during on-hook operation and to support ringing.

Conventional techniques for generating the SLIC input voltages include per channel power supplies (separate power supplies for voltage source) or shared, multiple output power supplies. While per-channel battery voltage generation can be implemented with a relatively low-cost inductor, it requires one inductor per channel, which contributes to the total cost and real estate consumed by the power supplies. A shared multiple output approach requires a single higher-cost transformer with multiple output taps to allow the different output voltages to be generated.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-4 illustrate example circuits and techniques for generating supply voltages for supporting a subscriber line. A voltage regulator includes a switching portion for generating a first supply voltage and a charge pump portion for generating a second supply voltage based on the first supply voltage. The magnitudes of the first and second supply voltages may be controlled based on the operating states of the subscriber lines supported by subscriber line interface circuits (SLICs) receiving the first and second supply voltages. Output capacitors coupled to the switching portion and the charge pump portion may be stacked to inhibit collapse of the second supply voltage responsive to a reduction in the steady state level of the first supply voltage.

Figure 1:
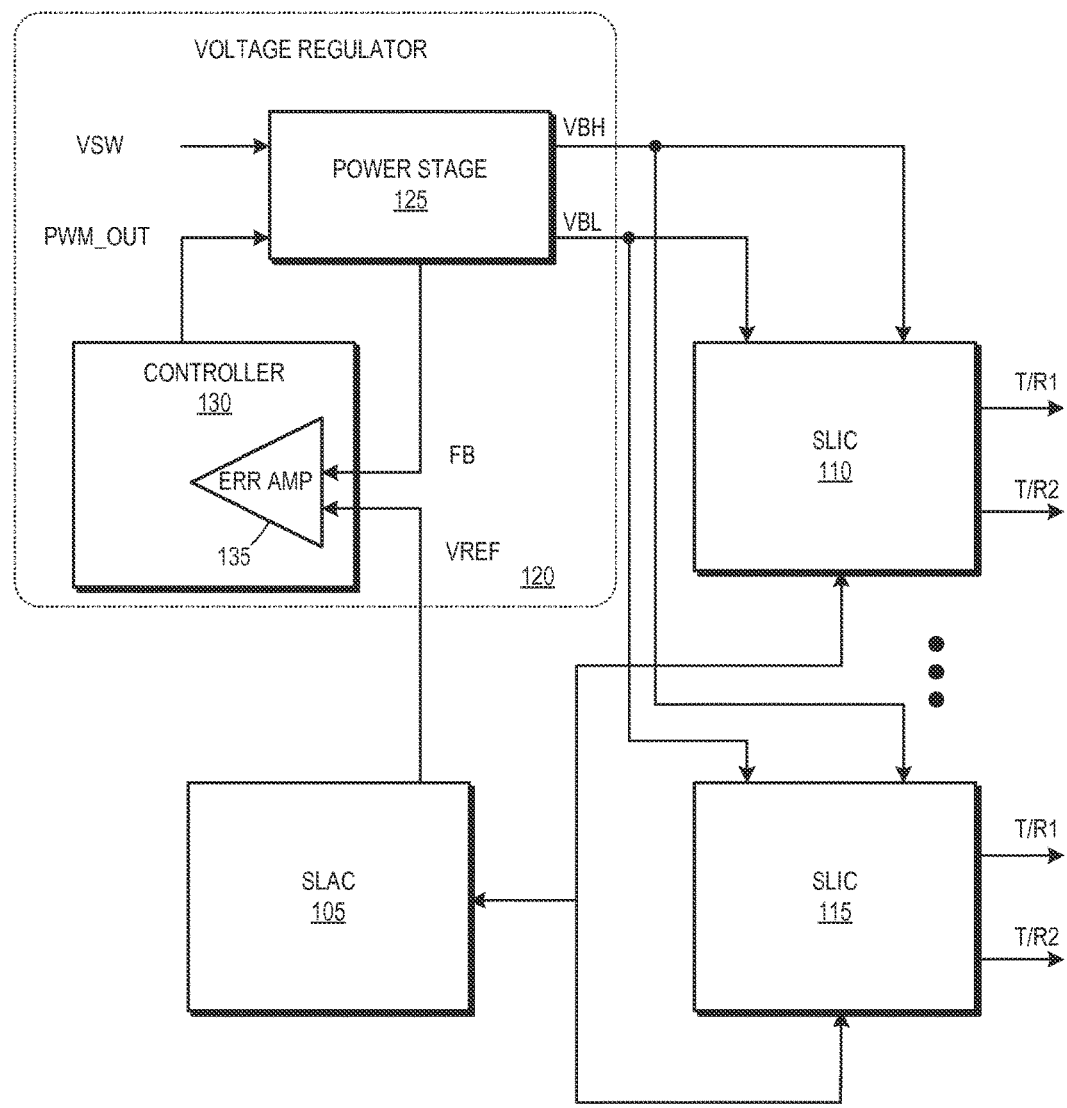
FIG. 1 is a block diagram of a communication system in accordance with some embodiments.

FIG. 1 is a simplified block diagram of a communication system 100 including a subscriber line audio processing circuit 105, a plurality of subscriber line interface circuits (SLICs) 110, 115, and a voltage regulator 120. The voltage regulator 120 includes a power stage 125 and a controller 130. The voltage regulator 120 generates supply voltages, VBH and VBL for use by the SLICs 110, 115 for supporting communication over subscriber lines TIP/RING lines, T/R1, T/R2. Although the controller 130 is illustrated as being a separate entity, it may be integrated into another unit, such as the SLAC 105. The controller 130 includes an error amplifier 135 that employs feedback ("FB") from the power stage 125 and a reference voltage ("VREF") from the SLAC 105 to control the power stage 125.

The general operation and configuration of SLIC devices 110, 115 and SLAC devices 105 are known to those of ordinary skill in the art, so only a high level description is provided. The SLICs 110, 115 provide the electrical interfaces for a foreign exchange subscriber (FXS) circuit for communication with a telephony device coupled to the TIP/RING lines, T/R1, T/R2. The SLAC 105 provides higher-level functions, such as audio signal conversion and processing, worldwide impedance matching, call control signal generation and detection, and battery voltage control.

The SLAC 105 configures the controller 130 with the desired voltage level, VREF, for the VBL supply voltage. The SLAC 105 may vary VREF responsive to the operating states of the SLICs 110, 115. Because VBH is generated based on VBL, varying VREF will vary both VBL and VBH. During operation, the SLAC 105 sets the value of VREF to equate to a value for VBL of approximately −25V while the SLICs 110, 115 are in idle states (on-hook). This VBL setting corresponds to a VBH level of approximately −60V. This VBH value is high enough to support an on-hook tip/ring voltage of −48V with sufficient headroom to also transmit caller ID signals. If a subscriber line goes off hook, its associated SLIC 110, 115 switches its voltage source from VBH to VBL to minimize power dissipation. When one of the SLICs 110, 115 is in a ringing state, the VBH voltage must be higher to support the required peak ringing voltage, approximately −70 to −80Vpk. As a result, the SLAC 105 increases VREF to correspond to a value for VBL of approximately −35V to −40V, resulting in VBH increasing to approximately −80 to −90V. The higher value for VBH provides sufficient headroom to support a clean sinusoidal ringing waveform. The other non-ringing line, if idle, will use VBH to maintain on-hook voltage. If the non-ringing line is active, it will use VBL to provide loop current to the off-hook subscriber line. When the ringing line is no longer in the ringing state, the SLAC 105 adjusts VBL back to −25V to reduce power consumption.

Figure 2:
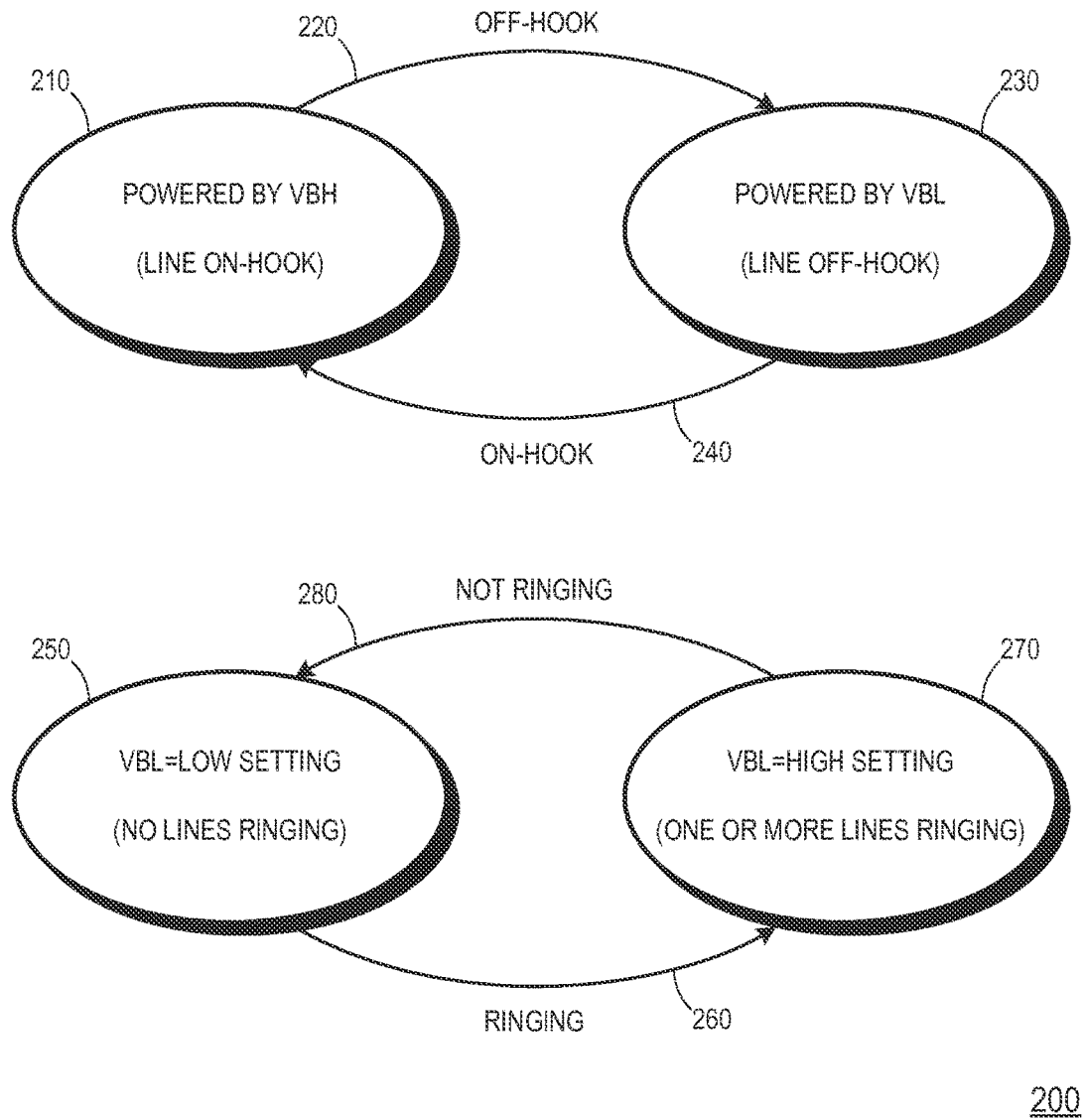
FIG. 2 is a state diagram illustrating the control of voltage levels and sources for subscriber line interface circuits in the system of FIG. 1 in accordance with some embodiments.

FIG. 2 is a state diagram 200 illustrating the control of voltage levels and sources for the SLICs 110, 115 in the system 100 of FIG. 1 in accordance with some embodiments. The SLICs 110, 115 select a voltage source based on their operating states. Each SLIC 110, 115 may select its voltage source independent of the operating states of the other SLICs 110, 115. If the subscriber line associated with a SLIC 110, 115 is on-hook, the SLIC 110, 115 draws power from the VBH source, as indicated by state 210. If the subscriber line goes off-hook, as indicated by transition 220, the SLIC 110, 115 changes to VBL, as indicated by state 230. When the subscriber line goes back on-hook, as indicated by transition 240, the SLIC 110, 115 returns to state 210 and selects VBH as it voltage source.

The SLAC 105 controls the level of VBL based on the operating states of the SLICs 110, 115. If no lines are ringing, the SLAC 105 controls VBL at a low setting value (e.g., VBL=−25V, VBH=−60V), as represented by state 250. If one or more SLICs 110, 115 enter a ringing state, as indicated by transition 260, the SLAC 105 increases the value for VBL to a high setting (e.g., VBL=−35V to −40V, VBH=−70V to −80V), as represented by state 270. When none of the SLICs 110, 115 are in ringing states, as indicated by transition 280, the SLAC 105 returns VBL to the low setting represented in state 250.

Figure 3:
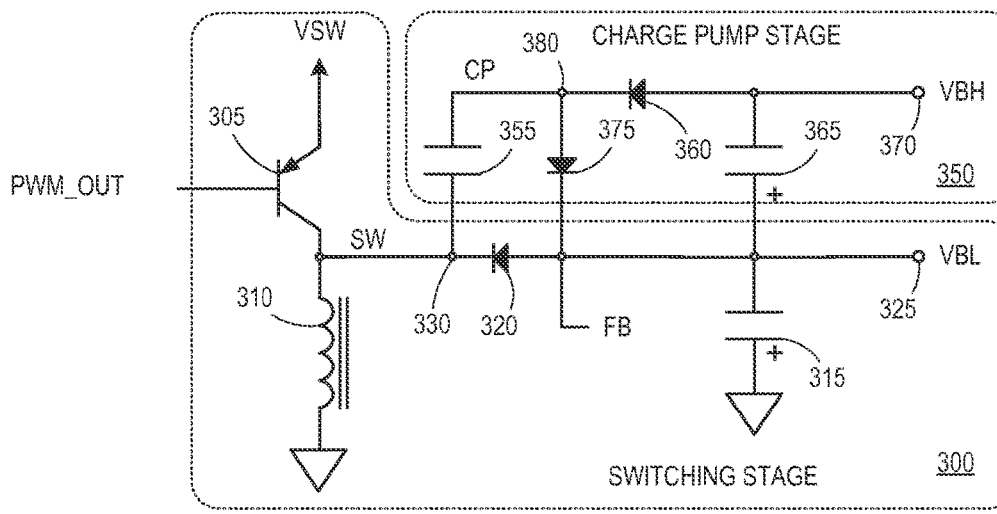
FIG. 3 is a circuit diagram of a voltage regulator power stage in the system of FIG. 1 in accordance with some embodiments.

FIG. 3 is a circuit diagram of the power stage 125 of the voltage regulator 120 of FIG. 1 in accordance with some embodiments. The power stage 125 includes a switching stage 300 for generating VBL and a charge pump stage 350 for generating VBH based on VBL. The switching stage 300 includes an electronically-controlled switch 305 (e.g., a PNP power transistor 305) coupled between an input voltage source, VSW, and an energy storage element 310 (e.g., an inductor 310). The switch 305 is controlled by a pulse width modulation output signal, PWM_OUT, generated by the controller 130 of FIG. 1. Energy stored in the inductor 310 via the transistor 305 is transferred to an output capacitor 315 through a diode 320 for generating VBL at an output terminal 325. The charge pump stage 350 includes a boost capacitor 355 coupled to a switching node 330 defined between the transistor 305 and the inductor 310. The boost capacitor 355 is coupled through a diode 360 to an output capacitor 365 for generating VBH at an output terminal 370. A diode 375 is coupled between a charge pump node 380 defined between the boost capacitor 355 and the diode 360 and the switching node 330.

Figure 4:
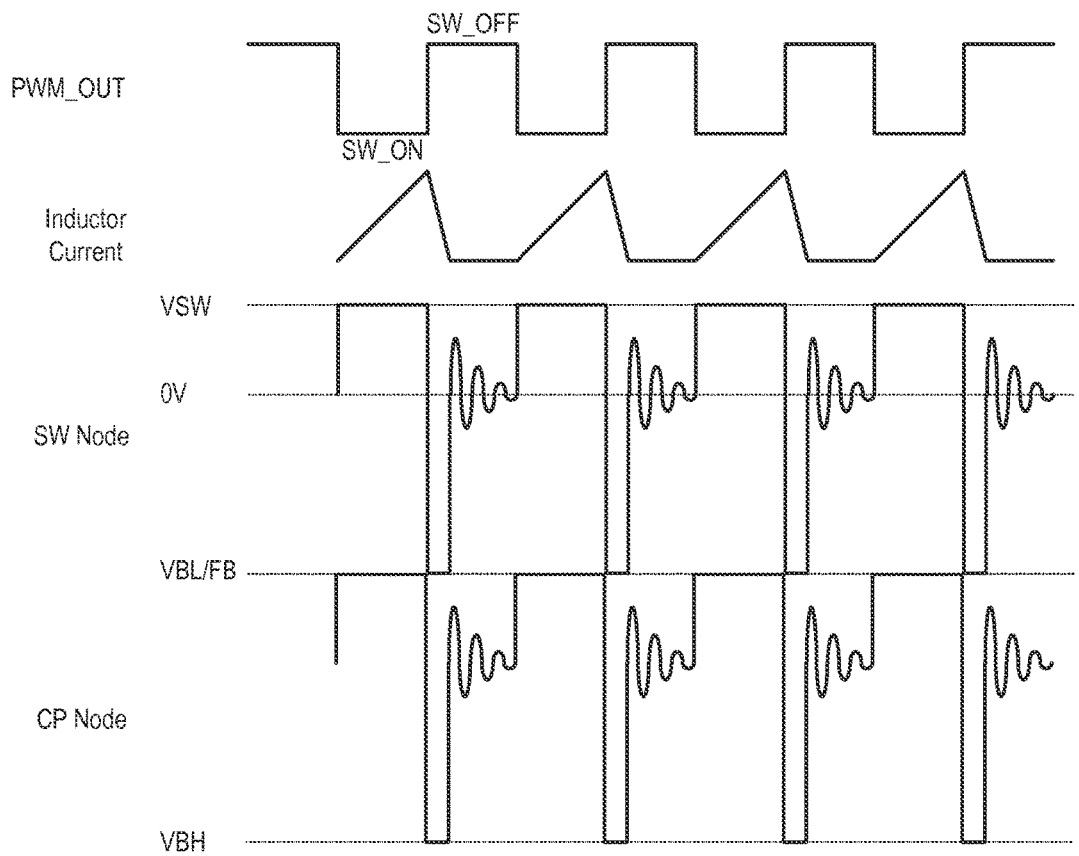
FIG. 4 is a diagram illustrating the operation of the power stage of FIG. 3 in accordance with some embodiments.

FIG. 4 is a diagram illustrating the operation of the power stage of FIG. 3 in accordance with some embodiments. Generally, the controller 130 sets the duty cycle of the PWM_OUT signal to control the level of VBL based on the feedback information provided by the error amplifier 135. Because the switch 305 is illustrated as a P-type device in FIG. 3, the on cycle, SW_ON, occurs when PWM_OUT is low and the off cycle, SW_OFF, occurs when PWM_OUT is high. The voltage at the switching node 330 is represented by the SW signal, and the voltage at the charge pump node 380 is represented by the CP signal. During a charging cycle, represented by SW_ON, the inductor 310 is charged, as evidenced by the inductor current increasing. The current ramps at a rate controlled by the values of VSW and the inductance of the inductor 310. The voltage, SW, at the switching node 330 corresponds to the voltage of the source, VSW, feeding the switch 305 (e.g., 12V). The voltage, CP, at the charge pump node 380 corresponds nominally to VBL less the forward diode drop of the diode 375. During this charging phase, energy is building in the inductor 310. The diodes 320, 360 are reverse biased, and thus prevent current from flowing to the output capacitors 315, 365, respectively. Since the voltage SW is VSW and the voltage CP is VBL, the voltage across the boost capacitor 355 is approximately VBL plus VSW (not counting diode drops). While the inductor 310 is charging, the diode 375 allows the boost capacitor 355 to be charged up to ~VBL+VSW, with the diode 360 being reverse biased When the switch 305 is turned off, the magnetic field of the inductor 310 collapses, and the SW voltage reverses polarity due to inductor flyback. The current stored in the inductor 310 is distributed through the diode 320 to the output capacitor 315 and through the boost capacitor 355 and the diode 360 to the output capacitor 365. The diode 375 is reverse biased. During the turn off period, as the SW voltage reverses polarity, the CP voltage also reverses polarity, but the boost capacitor 355 still maintains the ~VSW plus VBL charge. When the voltage SW reaches the VBL value, the voltage CP is VBL+VBL+VSW (2×VBL+VSW). Hence, for the low setting, with VBL=25 and VSW=12V, VBH=−62V. For the high setting, with VBL=−35 and VSW=12V, VBH=−82V. The current from the inductor 310 charges both output capacitors 315, 365. The diode 375 acts as a switch that allows charge to be added to the boost capacitor 355 while the inductor 310 charges, and then the diode 375 turns off, allowing the charge to be delivered to the output capacitor 365 associated with VBH. The output capacitors 315, 365 provide filtering and energy storage for the VBL and VBH voltages. Although only single output capacitors 315, 365 are illustrated for each voltage source, VBL, VBH, in some embodiments, additional filtering may be provided using RC networks (not shown).

The steady state value for the VBL voltage is regulated by the controller 130 by sampling the value of VBL at the output terminal 325 to generate the FB signal. In some embodiments, the controller 130 employs a fixed frequency, variable pulse width signal, where SW_ON is configurable to control the on time for the switch 305 to affect how much the energy storage element 310 is charged. Increasing the charge time increases the power delivered from VBL and decreasing the charge time decreases the power delivered from VBL. Thus, the controller 130 sets the duty cycle depending on the loading on VBL. The error amplifier 135 monitors the voltage on VBL, and the controller 130 adjusts the duty cycle of PWM OUT to maintain the appropriate voltage level.

To allow for better regulation of VBH, the output capacitors 315, 365 are stacked. Therefore, loading on VBH will cause energy to be removed from both output capacitors 315, 365, which will affect the VBL value and force a correction by the controller 130 to address the load. In practice, loading on either VBL or VBH will cause the controller 130 to adjust the duty cycle of PWM OUT to compensate. For example, when the steady state value for VBL is reduced to the lower set point, the coupling between the output capacitors 315, 365 prevents VBH from collapsing if it is loaded at a higher level than VBL. Both output capacitors 315, 365 will be depleted by the load on VBH until the controller 130 identifies the loading and controls the duty cycle to maintain VBL. In some embodiments, the output capacitors 315, 365 have the same capacitance values, so they discharge at the same rate.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processing system described above.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

The voltage regulator and voltage management techniques described herein decrease the cost of the circuitry and reduce power consumption. The switching stage 300 and the charge pump stage 350 share the inductor 310, thereby reducing the size and cost of the power stage 125. Changing the steady state value of VBL and VBH based on the operating states of the SLICs 110, 115 decreases power consumption, as higher voltages are produced only when needed to support ringing.

As disclosed herein, in some embodiments a voltage regulator includes a switch coupled between an input voltage terminal and an energy storage element, a first output capacitor coupled to a first node defined between the switch and the energy storage element, the first capacitor being coupled to a first output voltage terminal, a charge pump circuit coupled to the first node and comprising a second output capacitor coupled between a second output voltage terminal and the first output voltage terminal, and a controller operable to selectively enable the switch to control voltages generated at the first and second output terminals.

As disclosed herein, in some embodiments a system includes a plurality of subscriber line interface circuits, each operable to control communication over one of a plurality of subscriber lines, wherein each subscriber line interface circuit is operable to receive first and second control voltages, a switching stage operable to generate the first control voltage, a charge pump stage coupled to receive the first control voltage and generate the second control voltage based thereon, and a controller operable to control the switching voltage regulator so as to vary a magnitude of the first and second control voltages based on operating states of the subscriber line interface circuits.

As disclosed herein, in some embodiments a method includes generating a first control voltage for a plurality of subscriber line interface circuits using a switching voltage regulator, each operable to control communication over one of a plurality of subscriber lines, generating a second control voltage for the plurality of subscriber line interface circuits based on the first control voltage using a charge pump stage coupled to receive the first control voltage, and controlling the switching regulator to vary a magnitude of the first and second control voltages based on operating states of the subscriber line interface circuits.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A voltage regulator, comprising:
   a switch coupled between an input voltage terminal and an energy storage element;
   a first output capacitor coupled to a first node defined between the switch and the energy storage element, the first capacitor being coupled to a first output voltage terminal;
   a first diode coupled between the first output capacitor and the first node arranged to prevent current from flowing from the energy storage element to the first output capacitor during a charging phase of the energy storage element;
   a charge pump circuit coupled to the first node and comprising:
     a second output capacitor coupled between a second output voltage terminal and the first output voltage terminal;
     a third capacitor coupled between the first node and the second output terminal;
     a second diode coupled between the second output capacitor and the third capacitor arranged to prevent current from flowing from the third capacitor to the second output capacitor during the charging phase of the energy storage element;
     a second node defined between the third capacitor and the second diode; and
     a third diode coupled between the second node and the first output capacitor; and
   a controller operable to selectively enable the switch to control voltages generated at the first and second output terminals.

2. The voltage regulator of claim 1, wherein the energy storage element comprises an inductor.

3. The voltage regulator of claim 1, wherein the controller is operable to control a pulse width of a switching signal provided to the switch based on a voltage at the first output terminal.

4. A system comprising:
a plurality of subscriber line interface circuits, each operable to control communication over one of a plurality of subscriber lines, wherein each subscriber line interface circuit is operable to receive first and second control voltages; and
a switching stage operable to generate the first control voltage, the switching state comprising:
a switch coupled between an input voltage terminal and an energy storage element;
a first output capacitor coupled to a first node defined between the switch and the energy storage element, the first capacitor being coupled to a first output voltage terminal for providing the first control voltage; and
a first diode coupled between the first output capacitor and the first node arranged to prevent current from flowing from the energy storage element to the first output capacitor during a charging phase of the energy storage element:
a charge pump stage coupled to receive the first control voltage and generate the second control voltage based thereon, the charge pump stage comprising:
a second output capacitor coupled to a second output voltage terminal,
a third capacitor coupled between the first node and the second output terminal;
a second diode coupled between the second output capacitor and the third capacitor arranged to prevent current from flowing from the third capacitor to the second output capacitor during the charging phase of the energy storage element;
a second node defined between the third capacitor and the second diode; and
a third diode coupled between the second node and the first output capacitor; and
a controller operable to control the switching voltage regulator so as to vary a magnitude of the first and second control voltages based on operating states of the subscriber line interface circuits.

5. The system of claim 4, wherein the second output capacitor is coupled between the second output terminal and the first output terminal.

6. The system of claim 4, wherein the controller is operable to control the switch to generate the first control voltage at a first level responsive to none of the subscriber line interface circuits being in a ringing state and generate the first control voltage at a second level greater in magnitude than the first level responsive to at least one of the subscriber line interface circuits being in a ringing state.

7. The system of claim 4, wherein the energy storage element comprises an inductor.

8. The system of claim 4, wherein the controller is operable to control a pulse width of a switching signal provided to the switch based on a voltage at the first output terminal.

9. A method, comprising:
generating a first control voltage for a plurality of subscriber line interface circuits using a switching voltage regulator, each operable to control communication over one of a plurality of subscriber lines, the switching state comprising a switch coupled between an input voltage terminal and an energy storage element, a first output capacitor coupled to a first node defined between the switch and the energy storage element, the first capacitor being coupled to a first output voltage terminal for providing the first control voltage and a first diode coupled between the first output capacitor and the first node arranged to prevent current from flowing from the energy storage element to the first output capacitor during a charging phase of the energy storage element;
generating a second control voltage for the plurality of subscriber line interface circuits based on the first control voltage using a charge pump stage coupled to receive the first control voltage, the charge pump stage comprising a second output capacitor coupled to a second output voltage terminal, a third capacitor coupled between the first node and the second output terminal, a second diode coupled between the second output capacitor and the third capacitor arranged to prevent current from flowing from the third capacitor to the second output capacitor during the charging phase of the energy storage element, a second node defined between the third capacitor and the second diode, and a third diode coupled between the second node and the first output capacitor; and
controlling the switching regulator to vary a magnitude of the first and second control voltages based on operating states of the subscriber line interface circuits.

10. The method of claim 9, wherein controlling the switching regulator further comprises controlling the switching regulator to generate the first control voltage at a first level responsive to none of the subscriber line interface circuits being in a ringing state and generate the first control voltage at a second level greater in magnitude than the first level responsive to at least one of the subscriber line interface circuits being in a ringing state.

11. The method of claim 9, wherein controlling the switching regulator comprises controlling a pulse width of a switching signal provided to the switching voltage regulator based on a voltage of the first control voltage.

12. The method of claim 9, wherein the second output capacitor is coupled between the second output terminal and the first output terminal.

* * * * *

UNITED STATES PATENT AND TRADEMARK OFFICE
CERTIFICATE OF CORRECTION

PATENT NO. : 9,621,037 B2
APPLICATION NO. : 14/505688
DATED : April 11, 2017
INVENTOR(S) : Walter Rossi et al.

It is certified that error appears in the above-identified patent and that said Letters Patent is hereby corrected as shown below:

In the Claims

Column 7, Line 8 (Claim 4, Line 8), change "state" to "stage".

Column 7, Line 25 (Claim 4, Line 25), change "," to ";".

Column 8, Line 9 (Claim 9, Line 5), change "state" to "stage".

Signed and Sealed this
Twenty-third Day of May, 2017

Michelle K. Lee
*Director of the United States Patent and Trademark Office*